United States Patent [19]

Thomas

[11] Patent Number: 4,531,112
[45] Date of Patent: Jul. 23, 1985

[54] METHOD AND APPARATUS FOR TRANSMITTING FROM WITHIN A PNEUMATIC WHEEL ASSEMBLY

[76] Inventor: Stephen E. Thomas, 4015 Heron Pl., Fremont, Calif. 94536

[21] Appl. No.: 389,427

[22] Filed: Jun. 17, 1982

[51] Int. Cl.³ .................... B60C 23/02; B60C 23/04; H01Q 1/32
[52] U.S. Cl. .................................... 340/58; 73/146.5
[58] Field of Search ............... 340/58; 73/146.4, 146.5

[56] References Cited

U.S. PATENT DOCUMENTS 4,389,884 6/1983 Agulia .............................. 73/146.5

FOREIGN PATENT DOCUMENTS 2016383 9/1979 United Kingdom ................. 340/58

*Primary Examiner*—John W. Caldwell, Sr.
*Assistant Examiner*—Ellwood G. Harding
*Attorney, Agent, or Firm*—Paul L. Hickman

[57] ABSTRACT

A tire pressure transmitting apparatus characterized by an elongated antenna having a first end coupled within a wheel and a second end biased towards the wheel such that the antenna is positioned substantially within the circumferential depression in the absence of a counter-biasing force being exerted on it. As the wheel rotates, centrifugal force causes the second end of the antenna to move to a transmitting position within the void of the tire. The antenna is safely biased to a non-transmitting position as the wheel stops rotating.

11 Claims, 6 Drawing Figures

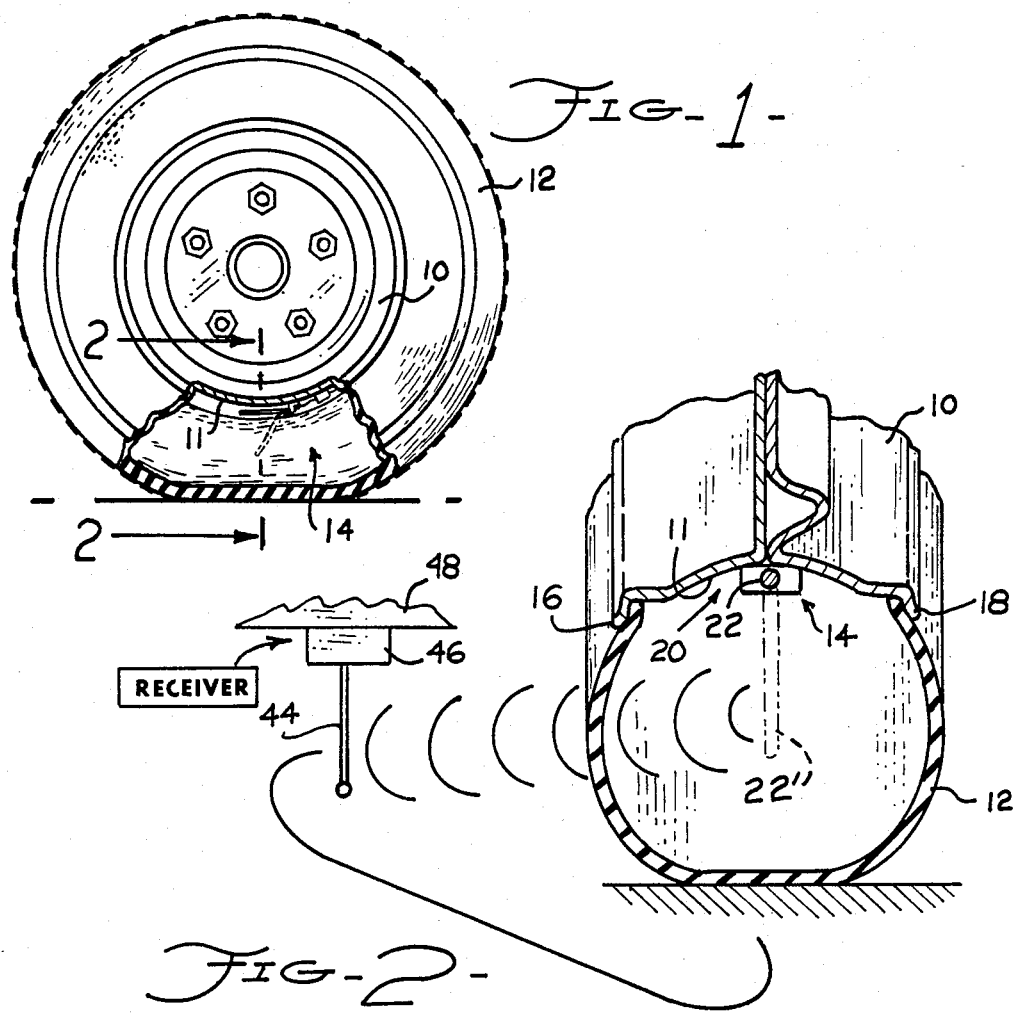
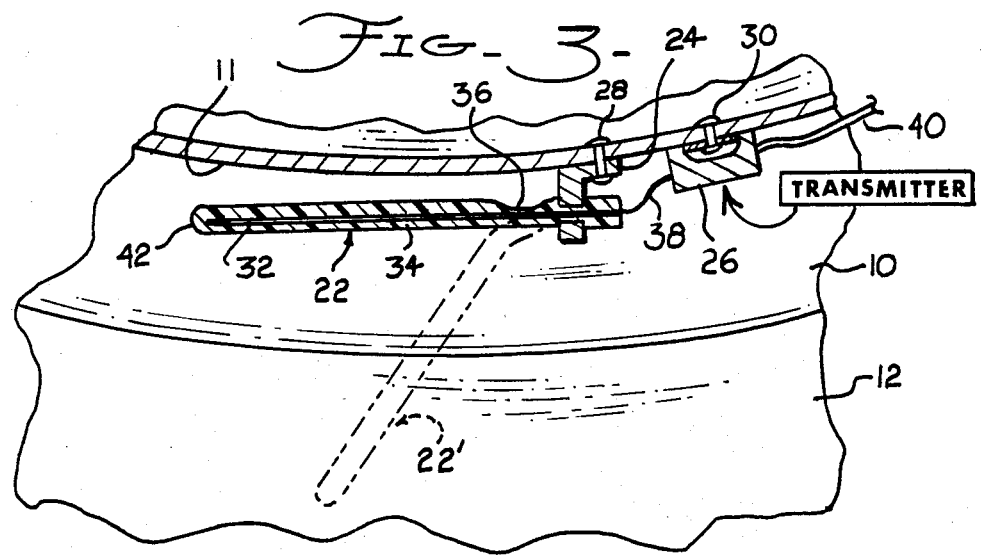

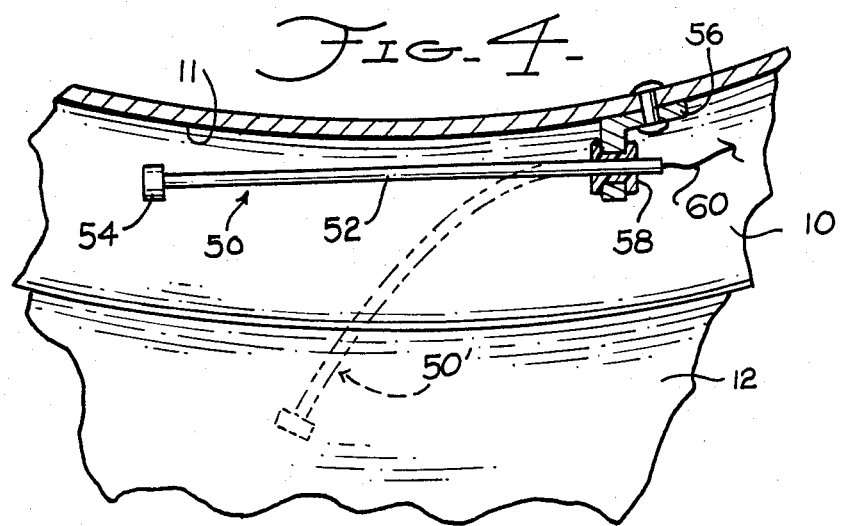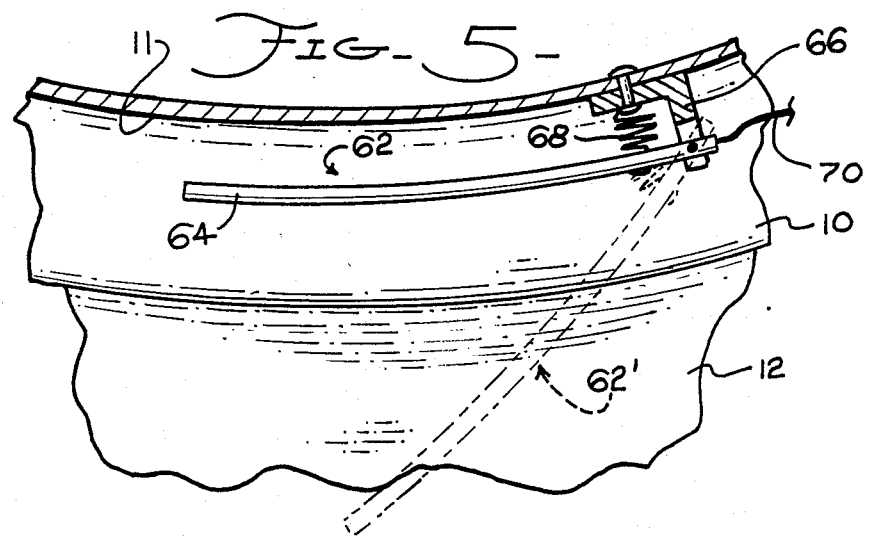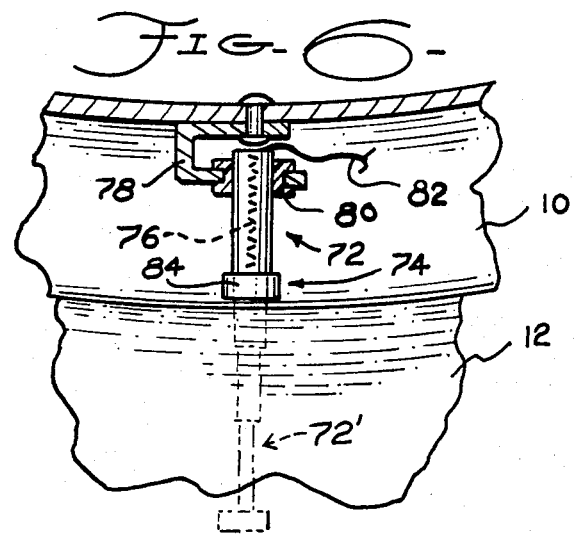

METHOD AND APPARATUS FOR TRANSMITTING FROM WITHIN A PNEUMATIC WHEEL ASSEMBLY

BACKGROUND OF THE INVENTION

1. Field of the Invention

This invention relates generally to telemetry devices and more particularly to telemetry devices disposed on or within a pneumatic wheel assembly.

2. Description of the Prior Art

The prior art teaches the concept of disposing a telemetry device within a pneumatic wheel assembly. Usually the telemetry device is used to signal when the pneumatic tire of the wheel assembly has gone flat, but may also signal such information as tire pressure, tire temperature, etc.

For example, in U.S. Pat. No. 4,237,728 of Betts a run-flat sensing system is described. Betts' system includes a sending unit 'A' attached within each wheel assembly of a vehicle, and a receiving unit 'B' attached to the frame of the vehicle. When a tire goes flat, a piezoelectric material 14 generates electricity to power a transmitter.

In U.S. Pat. No. 4,117,452 of Snyder a telemetry device is described which has a piezoelectric crystal that is deformed by a mechanical member 64 when the tire is flat. Mechanical member 64 is permanently extended into the void of the tire.

The wheel of a pneumatic wheel assembly has a pair of rim lips flanking a circumferential depression. The logical place to locate a telemetry device is within the circumferential depression but, since the wheel is invariably metallic, it is very difficult to transmit a strong signal from that location, due to the R. F. shielding effect of conductors. The prior art has addressed this problem by making the transmitter of the telemetry device very powerful so that a detectable signal can reach the receiver of the telemetry device. The prior art transmitters are heavy (which tends to unbalance the wheel assembly), and require a great deal of power.

A partial solution to the signal attenuation problem would be to permanently extend an antenna from the transmitter of the telemetry device into the void of the pneumatic tube and transmit through the substantially non-metallic sidewalls of the tire. One problem with such a solution is that it would be very difficult to remove and mount the tire because the antenna would get in the way. Another problem with this solution is that the antenna, transmitter, and tire could possibly be damaged when the tire goes flat.

SUMMARY OF THE INVENTION

An object of this invention is to provide a method and apparatus for more efficiently transmitting telemetry signals from within a pneumatic wheel assembly.

Another object of this invention is to provide an apparatus as described above which further will not be damaged should the tire go flat.

Yet another object of this invention is to provide an apparatus as described above which will not further damage a flattened tire.

A still further object of this invention is to provide an apparatus as described above which also does not interfere with the removal of a tire from the wheel, nor the remounting of a tire to the wheel.

Briefly, an apparatus of this invention includes an antenna having a first end and a second end, means coupling the first end to a circumferential depression of a wheel, means biasing the second end towards the wheel such that the antenna is positioned substantially within the circumferential depression when no counter-biasing force is exerted on it, and a transmitter having an output coupled to the antenna.

When the wheel is rotating centrifugal force causes the second end of the antenna to rotate to a transmitting position within the void of the tire. The biasing means safely returns the antenna to a non-transmitting position within the circumferential depression of the wheel when the wheel stops rotating.

A method of this invention includes coupling a portion of an antenna to a circumferential surface of a wheel; biasing a free end of the antenna towards the circumferential surface; coupling the output of a transmitter to the antenna; and rotating the wheel to cause the free end of the antenna to extend into the void of the pneumatic tire.

An advantage of this invention is that the antenna transmits through the sidewalls of the tire so that less of the telemetry signal is attenuated. Due to this greater transmission efficiency a transmitter having small power requirements can be used.

Another advantage of this invention is that the antenna returns to a protected position when the wheel stops rotating so that the tire, antenna and transmitter are protected from damage when the tire goes flat.

A further advantage of this invention is that the antenna does not interfere with the normal removal and mounting of a tire.

These and other objects and advantages of the present invention will no doubt become apparent upon a reading of the following descriptions and a study of the several figures of the drawing.

BRIEF DESCRIPTION OF THE DRAWING

FIG. 1 is a is a partially broken front elevational view of a pneumatic wheel assembly provided with an apparatus in accordance with the present invention.

FIG. 2 is a cross-sectional view taken along line 2—2 of FIG. 1.

FIG. 3 is a detail view of the apparatus shown in FIGS. 1 and 2.

FIG. 4 is a detail view of an alternate embodiment of the present invention.

FIG. 5 is a detail view of another alternate embodiment of the present invention.

FIG. 6 is a detail view of a third alternate embodiment of the present invention.

DETAILED DESCRIPTION OF THE PREFERRED EMBODIMENT(S)

Referring to FIG. 1, a pneumatic wheel assembly includes a metallic wheel 10 and a pneumatic tire 12. The apparatus 14 of the present invention is attached to a circumferential surface 11 of wheel 10 and is completely confined within the wheel assembly.

In the cross-sectional view of FIG. 2, the wheel can be seen to have a pair of rim lips 16 and 18 which flank a circumferential depression 20. The apparatus 14 of the present invention is attached to surface 11 within depression 20 so that it is protected against damage by the rim lips 16 and 18 when the tire goes flat.

In the enlarged, broken view of FIG. 3 a first preferred embodiment of this invention is shown to include an antenna 22, a bracket 24 supporting the antenna, and a transmitter 26. Bracket 24 and transmitter 26 are rigidly attached to wheel 10, such as by rivets 28 and 30, respectively.

The antenna is elongated, and includes a conductor 32 covered by an insulator 34. The insulator 34 is preferably made from a thermoplastic material having sufficient resiliency to bias the antenna towards surface 11. As noted in the figure, the thickness of insulator 34 may be reduced at 36 to provide a 'live hinge' at that point.

One end of conductor 32 is coupled to the output 38 of the transmitter. The transmitter is used to produce R.F. telemetry signals in response to conditions sensed by a sensor 40. Transmitter 26 is either powered by an internal battery or an external battery or generator.

As wheel 10 rotates, a centrifugal force is developed on the free end 42 of the antenna, causing it to move to a position 22' within the void of tire 12. As noted in FIG. 2, this allows the transmitter antenna 22 to radiate through the sidewall of tire 12 to a receiving antenna 44 connected to the input of a receiver 46. The receiver is preferably attached to the frame 48 of the vehicle.

When the wheel 10 stops rotating the inherent resilience of insulator 34 returns the antenna to its position at 22 where it is protected from damage. If the tire goes flat, it is protected from further damage by the antenna because the antenna will tend to swivel out of the way as the vehicle comes to a stop. Furthermore, the antenna does not interfere with the removal or mounting of the tire when it is in its non-transmitting position 22.

In FIG. 4, an alternate construction for an antenna 50 includes an elongated, spring steel rod 52 having a weight 54 attached to its free end. The rod 52 is supported by a bracket 56 and an insulating grommet 58, and is coupled to an output 60 of a transmitter. When the wheel rotates the rod bends to a position 50' where it may transmit through the sidewall of tire 12.

In FIG. 5, another alternate construction for an antenna 62 is shown, including an elongated, arcuate member 64 pivotally attached to a bracket 66. The arcuate member 64 is biased towards the wheel by a spring 68 extending between the member and the bracket and is coupled to the output 70 of a transmitter. Member 64 preferably has a radius of curvature concentric to that of wheel 10 to insure that no portion of its length width extend beyond the rim lips when the wheel is stationary. The antenna rotates to a position 62' against the biasing force of spring 68 when the wheel is rotating.

In FIG. 6, an embodiment of a radially extensible antenna includes a collapsible whip type antenna having a free end 74 biased towards the wheel by an internal spring 76. The antenna is supported by a bracket 78 and an insulating grommet 80, and is coupled to the output 82 of a transmitter. A weight 84 may be attached to the free end of the collapsible whip. When the wheel rotates, the antenna radially extends to a transmitting position 72'. As the wheel stops rotating the antenna is returned to its non-transmitting position 72 by spring 76.

The method of this invention should be fairly apparent from the above descriptions. Briefly, the method includes the steps of: coupling a portion of an antenna to a circumferential surface of a wheel; biasing a free end of the antenna towards the wheel; coupling the output of a transmitter to the antenna; and rotating the wheel to extend the free end of the antenna into the void of the pneumatic tire.

While this invention has been described in terms of a few preferred embodiments, it is contemplated that persons reading the preceding descriptions and studying the drawing will realize various alterations, permutations and modifications thereof. For example, all of the above embodiments illustrate the use of a monopole antenna. It is within the scope of this invention to have a centrally hinged dipole antenna having two hinged antenna portions independently extensible into the void of the tire. Furthermore, there are other types of radially extensible antenna possible, such as a wire antenna weighted at its free end and attached to a spring loaded reel at its other end.

It is therefore intended that the following appended claims be interpreted as including all such alterations, permutations and modifications as fall within the true spirit and scope of the present invention.

What is claimed is:

1. An apparatus for transmitting from within a pneumatic wheel assembly including a wheel having a pair of rim lips flanking a circumferential depression, and a pneumatic tire mounted on said wheel in engagement with said rim lips, said apparatus comprising:
   a transmitter antenna;
   means coupling a portion of said antenna within said circumferential depression of said wheel such that a free end of said antenna may extend beyond said rim lips into the void of said pneumatic tire;
   means biasing said free end towards said wheel, whereby said antenna is positioned substantially within said circumferential depression in the absence of a counter-biasing force upon said free end; and
   transmitter means attached to said wheel and having an output coupled to said antenna.

2. An apparatus as recited in claim 1 wherein said antenna includes an elongated conductor covered, at least in part, by an insulating material.

3. An apparatus as recited in claim 2 wherein insulating material comprises said biasing means.

4. An apparatus as recited in claim 2 wherein said antenna is pivotally coupled to said wheel, and further comprising spring means coupled to said antenna for biasing said free end towards said wheel.

5. An apparatus as recited in claim 1 wherein said antenna includes an elongated conductor having sufficient resiliency to bias said free end towards said wheel in the absence of a counter-biasing force.

6. An apparatus as recited in claim 1 further wherein said antenna is weighted proximate said free end.

7. An apparatus as recited in claim 1 wherein said antenna is radially extensible such that said biasing means causes said antenna to radially collapse when not subject to a counter-biasing force.

8. An apparatus as recited in claim 1 further comprising receiver means attached to a vehicle supported, in part, by said wheel assembly, said receiver means including a receiving antenna receptive to a signal radiated through said pneumatic tire from said transmitter antenna.

9. An apparatus as recited in claim 1 wherein said transmitter antenna is an elongated, arcuate member having a radius of curvature concentric to that of said wheel.

10. A method for transmitting from within a pneumatic wheel assembly including a wheel and a pneumatic tire circumferentially mounted on said wheel, the method comprising: coupling a portion of an antenna to a circumferential surface of said wheel; biasing a free end of said antenna towards said circumferential surface; coupling the output of a transmitter to said antenna; and rotating said pneumatic wheel assembly to cause said free end to extend into the void of said pneumatic tire.

11. An apparatus for transmitting from within a pneumatic wheel assembly including a wheel having a pair of rim lips flanking a circumferential depression, and a pneumatic tire mounted on said wheel in engagement with said rim lips, said apparatus comprising:
 a transmitter antenna including an elongated conductor covered, at least in part, by an insulating material;
 means coupling a portion of said antenna within said circumferential depression of said wheel such that a free end of said antenna may extend beyond said rim lips into the void of said pneumatic tire;
 biasing means biasing said free end towards said wheel, whereby said antenna is positioned substantially within said circumferential depression in the absence of a counter-biasing force upon said free end, said insulating material comprising said biasing means; and
 transmitter means attached to said wheel and having an output coupled to said antenna.

* * * * *